Figure 4:
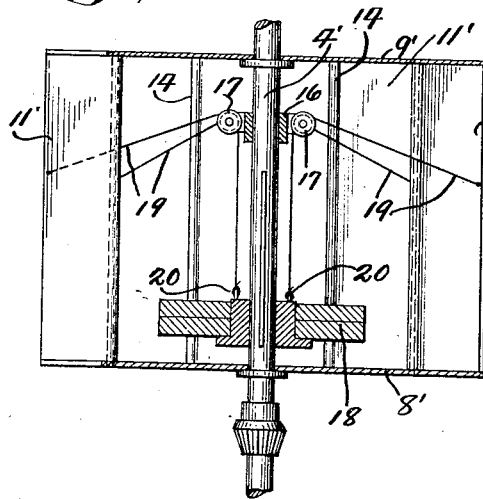

Dec. 24, 1929.　　　　H. I. HOHLT　　　　1,740,595
STREAM MOTOR
Filed July 22, 1926　　　　2 Sheets-Sheet 1
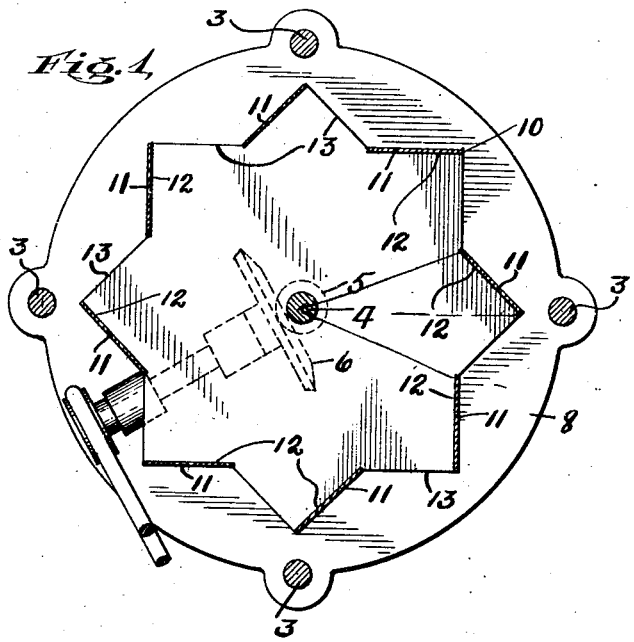
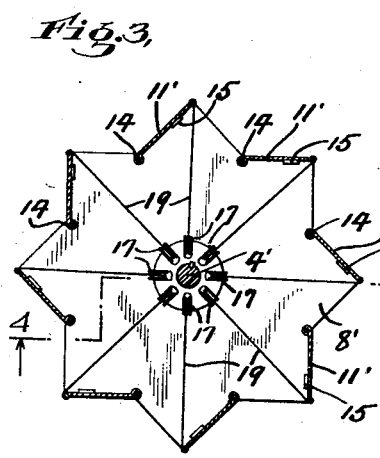
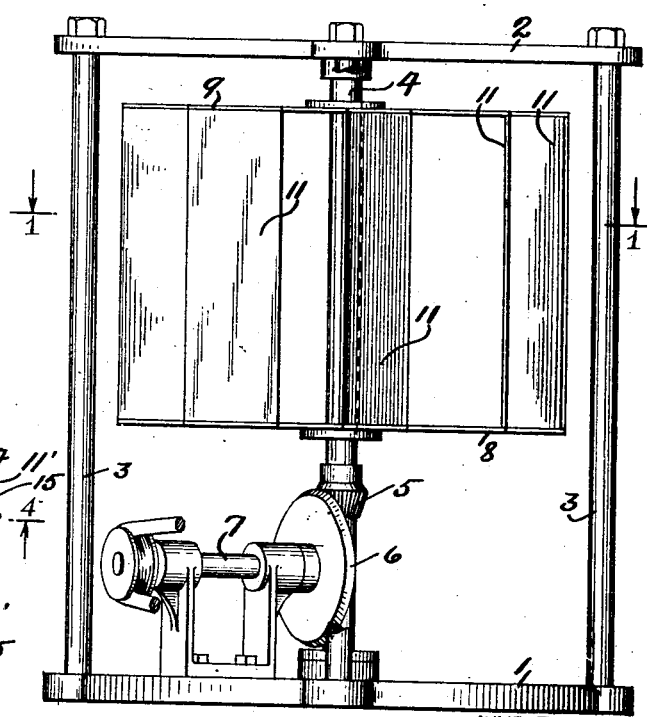
INVENTOR
Hans I. Hohlt
BY
Kiddle and Marqueson.
ATTORNEYS.

Dec. 24, 1929.    H. I. HOHLT    1,740,595
STREAM MOTOR
Filed July 22, 1926    2 Sheets-Sheet 2

Patented Dec. 24, 1929

1,740,595

UNITED STATES PATENT OFFICE

HANS I. HOHLT, OF SANTO DOMINGO, DOMINICAN REPUBLIC

STREAM MOTOR

Application filed July 22, 1926. Serial No. 124,118.

My invention relates to an improvement in devices hereinafter to be referred to as stream motors, and has for one of its objects the provision of a motor adapted to be actuated either by air, tide, or flowing water, the device to be submerged in the impelling stream and being so constructed as to rotate always in the one direction as long as the impelling stream, the direction of flow of which may change, flows at an angle to the axis about which the device is rotated.

A still further object of my invention is the provision of a stream motor which remains stationary at all times in its impelling stream, so far as bodily movement is concerned, as distinguished from motors of the windmill type, for example, which by reason of their construction must be given a bodily movement either automatically or manually to position them properly each time the direction of the wind changes.

A still further object of my invention is the provision of a stream motor which is rotatable on a vertical axis, thereby enabling the gear train or other mechanical apparatus employed for the transmission of power from the motor to be positioned so as to be readily accessible, as distinguished from windmills, for instance, of the usual type, which are mounted to rotate about a horizontal axis, making it necessary to provide gear mechanism or some such equivalent apparatus at a distance above the ground, where, of course, the same is not readily accessible.

A still further object of my invention is the provision of a stream motor in which the speed may be automatically regulated, this regulation of speed being effected by means of a simple apparatus which automatically shifts or varies the effective area of the vanes or wings of the motor.

My improved motor, as above pointed out, is adapted for submergence in a water stream, as in a river, for example, or it may be submerged in the ocean, to be driven by the tide, and inasmuch as the device will always rotate in the one direction provided the impelling stream in which the device is submerged is flowing at an angle to the axis of rotation of the device, no complicated mechanism is necessary for effecting bodily movement of the device. In other words, the motor may be submerged in an impelling stream in a given location, and will run indefinitely without further attention.

A still further object of my invention is the provision of a stream motor in which the power delivered is dependent upon the distance of the vanes or blades of the device from the axis of rotation of the motor, thereby enabling the same to be very easily designed for a predetermined output.

In the accompanying drawings I have illustrated three embodiments of my invention—

Figure 5:
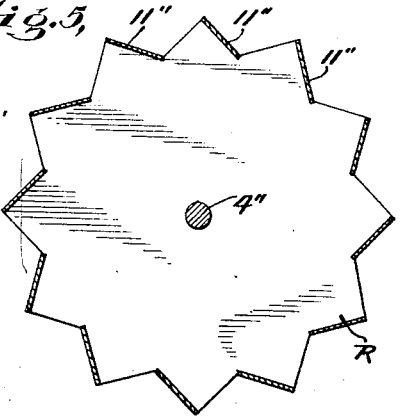
Figure 6:
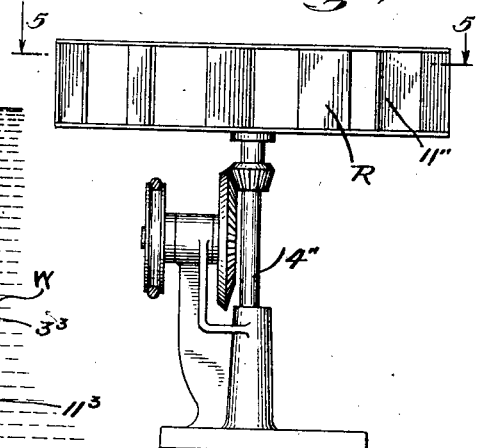

Figure 1 being a sectional plan view of one embodiment of my invention;

Fig. 2 illustrating the construction of Fig. 1 in side elevation;

Fig. 3 showing a modified form of my invention, in which my improved motor is provided with means for automatically regulating the speed of the same;

Fig. 4 being a sectional elevation of the apparatus of Fig. 3, the section being taken on the line 4—4 of Fig. 3;

Fig. 5 being a sectional plan view of another form of my invention taken on the line 5—5 of Fig. 6;

Fig. 6 showing the apparatus of Fig. 5 in elevation; and

Figure 7:
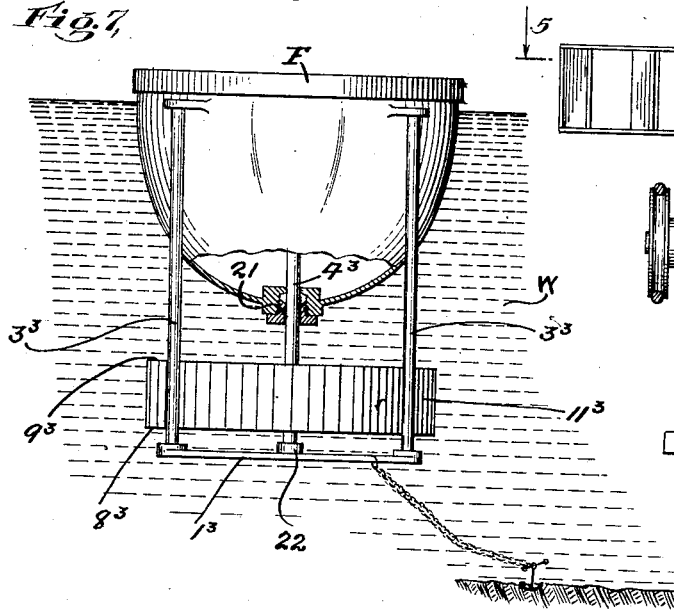

Fig. 7 showing my improved motor submerged in a water stream.

Referring to the drawings in detail, and first of all to Figs. 1 and 2, the improved motor of these two figures comprises a fixed base or mounting 1, and a fixed upper frame or spider structure 2. 3 designates a plurality of stationary uprights or braces for supporting the spider 2.

Mounted in suitable bearings, in the bottom and top members 1 and 2, respectively, is a rotatable drive shaft 4, provided adjacent its lower end with a gear 5, meshing with a gear 6, carried on a shaft 7, the latter being the power delivery shaft.

Rigidly secured to the drive shaft 4 is the rotor of my improved motor, this rotor comprising an imperforate base member 8 and an imperforate top member 9. These two members are identical in construction, each being a regular polygon having, as illustrated, sixteen sides. The members 8 and 9 are disposed horizontally and in exact parallelism, so that the planes of these two members are at right angles to the shaft 4. For best efficiency the distance from the center of the shaft 4 to the extreme periphery of the base and top, as, for example, to the point 10 on Fig. 1, should be equal to the vertical distance between these two members. If the distance between the bottom piece 8 and top piece 9 be decreased, the width or diameter of the members 8 and 9 should be correspondingly increased.

At the periphery of the members 8 and 9 I provide a series of vertically disposed vanes, which in the illustration of Fig. 1 are rigidly secured to the members 8 and 9. These vanes are designated 11 on the drawings, and from Fig. 1 it will be seen that there are half as many vanes as there are sides to the polygon. In other words, the polygonal members 8 and 9 having sixteen sides, as illustrated, eight vanes 11 will be employed. These vanes are secured to alternate sides 12 of the members 8 and 9, each vane forming a right angle with the adjacent side 12 of the polygons, the vanes forming an angle of 45° with each other.

When the device is submerged in an impelling stream, as the air, for instance, the rotor will be caused to rotate around the longitudinal axis of the shaft 4, that is to say, about a vertical axis and in a direction which is dependent upon whether the vanes 11 are fastened to the sides 12 of the bottom and top members 8 and 9 or to the sides 15. The impelling stream on striking the vanes nearest thereto will be slightly deflected thereby with the resultant creation of regions of reduced pressure externally of the vanes. The suction so provided constitutes a powerful factor for turning the rotor. A part of the stream will enter the rotor, and have its velocity reduced therein and changed into pressure that will act on the vanes to promote rotation of the rotor in the direction in which the suction actuates the same. In the illustration of Fig. 1 rotation will be in an anti-clockwise direction, no matter in which direction the impelling stream is flowing, as long as it is flowing at an angle to the longitudinal axis of the shaft 4.

It will be seen, therefore, that I have provided a stream motor rotatable about a vertical axis and always in the same direction independently of the direction of flow of the impelling stream, and while I have described my motor as being provided with eight vanes, it is to be understood that this number may be varied, if desired, but preferably eight or any multiple of eight.

In the embodiment of my invention illustrated in Figs. 3 and 4, wherein I have modified the construction above described, 4' designates a vertically disposed drive shaft corresponding to the shaft 4 of Fig. 1 and on which are mounted bottom and top polygonal members 8' and 9', respectively. Extending vertically, that is to say, parallel to the shaft 4', are a series of uprights or posts 14, and pivoted on each of these posts is a vane 11' corresponding to the fixed vanes 11 of Fig. 1. The vanes 11' are adapted to swing outwardly, that is to say, to be thrown outwardly by centrifugal force, when the device is in operation, and their movement inwardly, that is to say, in the opposite direction, is limited by a stop 15. A stop is provided for each vane.

The shaft 4' is provided with a collar 16 carrying a plurality of rollers or pulleys 17 corresponding in number to the number of vanes 11'. The shaft 4' also is provided with a governor weight 18. The ring 16 is rigidly attached to the shaft 4' while the governor weight 18 is keyed to the shaft, so as to be slidable longitudinally of the same and yet rotate with it. Secured at the periphery of each of the vanes 11', that is to say, adjacent the outer edge thereof, is a cord, chain, or other suitable flexible connection 19, each one of these cords passing over a pulley 17 and extending downwardly to be secured at 20 to the counterweight 18.

It is to be understood that this device may be mounted in a manner similar to the device of Figs. 1 and 2 so far as supporting structure is concerned, and in any event is disposed vertically so far as axis of rotation is concerned.

When the device is in operation, the impelling stream, whether air or water, will always cause the same to rotate in the one direction, as in the case of the device of Fig. 1, even though the impelling stream may change in direction, as long as the direction of travel of the stream is at an angle to the longitudinal axis of the shaft 4', which is the axis of rotation of the device. When in operation, the centrifugal force of the rotating parts will cause the vanes 11' to swing outwardly, or tend to swing outwardly, about the pivots 14, this action being resisted by the governor weight 18. As the speed of the rotor increases due to an increase in velocity of the impelling stream beyond a predetermined speed or a speed at which it is desired to maintain the rotor, the vanes 11' will overcome the governor weight 18, raising the same, thereby permitting the vanes 11' to swing outwardly about the pivots 14 to reduce the area of the vane exposed to the impelling stream. As a consequence, the speed of the rotor will be kept down to whatever speed the apparatus is designed for, and this regardless of the velocity of the impelling stream.

In Figs. 5 and 6 I have modified the constructions above described in detail only and not as far as principle of operation or principle of construction is concerened. Referring to this figure, the rotor, instead of being mounted as in the case of Figs. 1 to 4 inclusive, is mounted on a vertically extending shaft 4″ having a lower bearing only instead of the two bearings illustrated in Fig. 2, for instance. The rotor of Figs. 5 and 6 I will designate R. In this form the rotor is made up of vanes 11″ and will rotate always in the one direction about the longitudinal axis of the shaft 4″ as long as the impelling stream in which the device is submerged is flowing at an angle to the longitudinal axis of the shaft 4″.

In the illustration of Fig. 7 I have shown my improved device mounted, or rather submerged, in a stream of water. Referring to this figure, F designates a float to which my device may be attached and by which the same may be anchored so as to be held in the stream. This float F may take any number of different forms, depending upon local conditions. The structure to which the rotor of my improved device is attached or by which it is suspended comprises a bottom or base $1^3$, which corresponds, for instance, to the base 1 in Fig. 2, and side posts or uprights $3^3$ corresponding to the side posts of Fig. 2, these latter members being attached in any suitable manner to the float F. The shaft $4^3$ has one bearing in the float F, as indicated at 21, and its other bearing at 22 in the member $1^3$. This shaft, of course, is rotatable in its bearings. On this shaft I mount a rotor comprising polygonal bottom and top members $8^3$ and $9^3$ and to which I secure vanes $11^3$ corresponding to the vanes 11 of Fig. 1, for instance. In this form of my invention the rotor will always rotate in the one direction, as in the case of all the other figures described, regardless of the direction of flow of the water W, as long as the water flows at an angle to the axis of the shaft $4^3$.

In all the forms of my invention above described it will be seen that I have provided a motor which I have termed a stream motor, so constructed and arranged as to always move in the one direction, thereby enabling the device to be anchored against bodily movement, as distinguished from stream motors of the windmill type, for instance, which must be pivoted in some manner to permit the same to swing around to offset any changes in direction of the wind. This simplifies greatly the structure necessary for an installation, doing away with expensive and sometimes complicated mountings, and inasmuch as the shaft about the axis of which the rotor of my improved device is rotated is disposed vertically, I am able to drop the gear train or other mechanism employed for transmitting power from the motor near the ground, or at the ground, where it is, of course, accessible at all times for maintenance and repair or inspection.

It is to be further understood that while I have shown a gear train connected to my improved motor, I am not attempting to show the mechanism to which this gear train is attached, as obviously my improved device may be employed for any purpose desired where power is required. For instance, the same may be used to drive a pump or for generating current, or for any other purpose.

It is to be clearly understood that while I have illustrated and described several embodiments of my invention, changes may be made in the details thereof within the purview of my invention.

What I claim is:

1. In a device of the character described the combination of a rotor and means for mounting the same for rotation in an impelling stream, the rotor having vanes making similar angles with one another, the successive angles between radial lines drawn to the leading and trailing edges of the vanes being substantially equal, so that the rotor will rotate always in the one direction as long as the direction of flow of the impelling stream is at an angle to the axis of rotation of the rotor.

2. In a device of the character described the combination of a shaft, two polygonal members mounted on said shaft in spaced relation to each other, adjacent sides of said polygonal members at the periphery of said members making a right angle with each other, and vanes attached to alternate sides of said members and spanning the space between said members to provide a rotor rotatable only in one direction when the impelling stream within which the device is submerged is moving at an angle to the longitudinal axis of said shaft.

This specification signed this tenth day of July, 1926.

HANS I. HOHLT.